B. ADRIANCE & A. CALLESON.
DUPLEX CAN HEADING MACHINE.
APPLICATION FILED JULY 22, 1907.
947,271.
Patented Jan. 25, 1910.
8 SHEETS—SHEET 6.
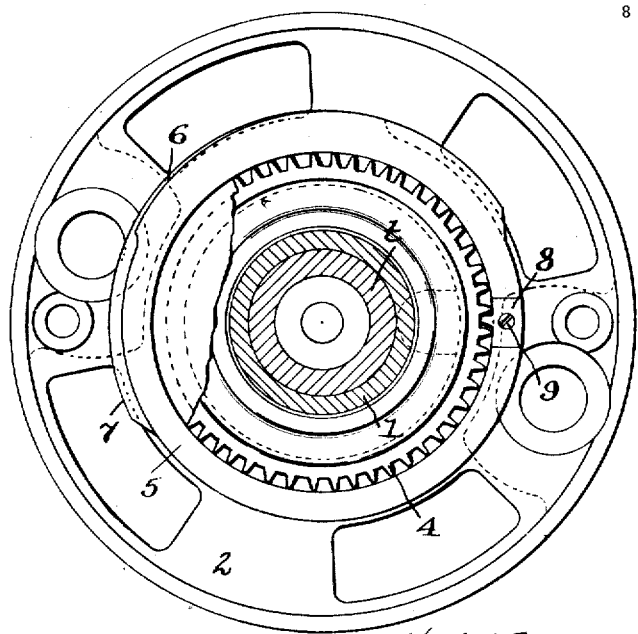
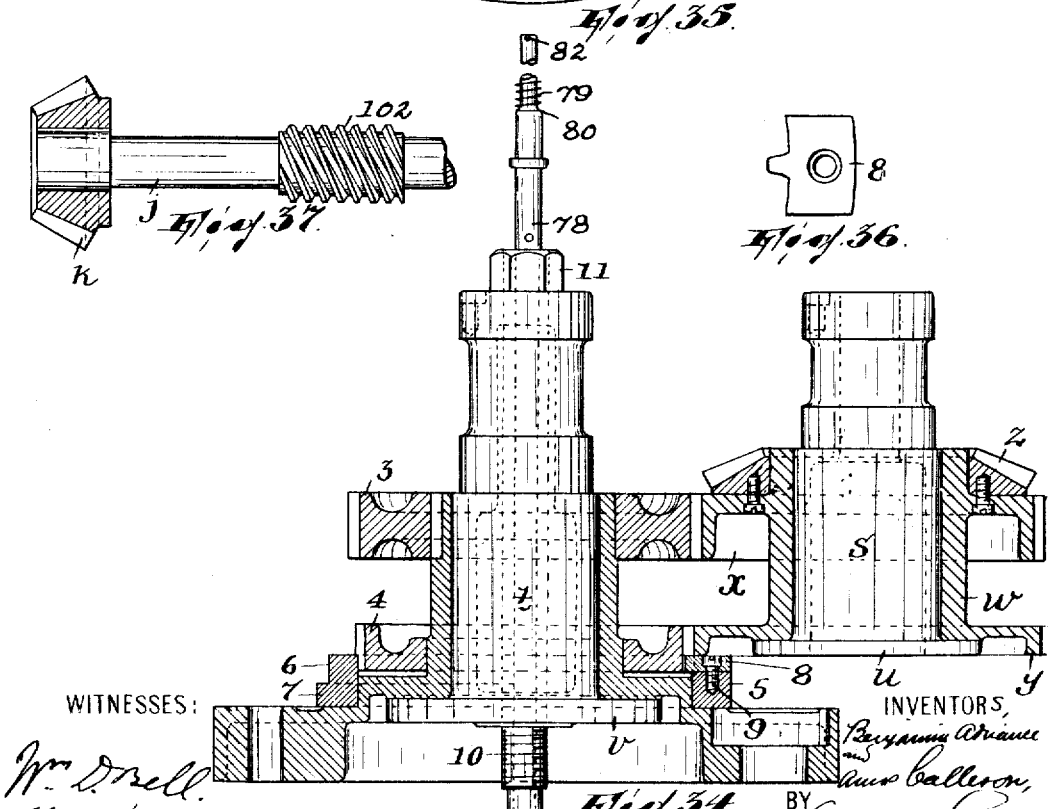
WITNESSES:
INVENTORS,
ATTORNEYS.

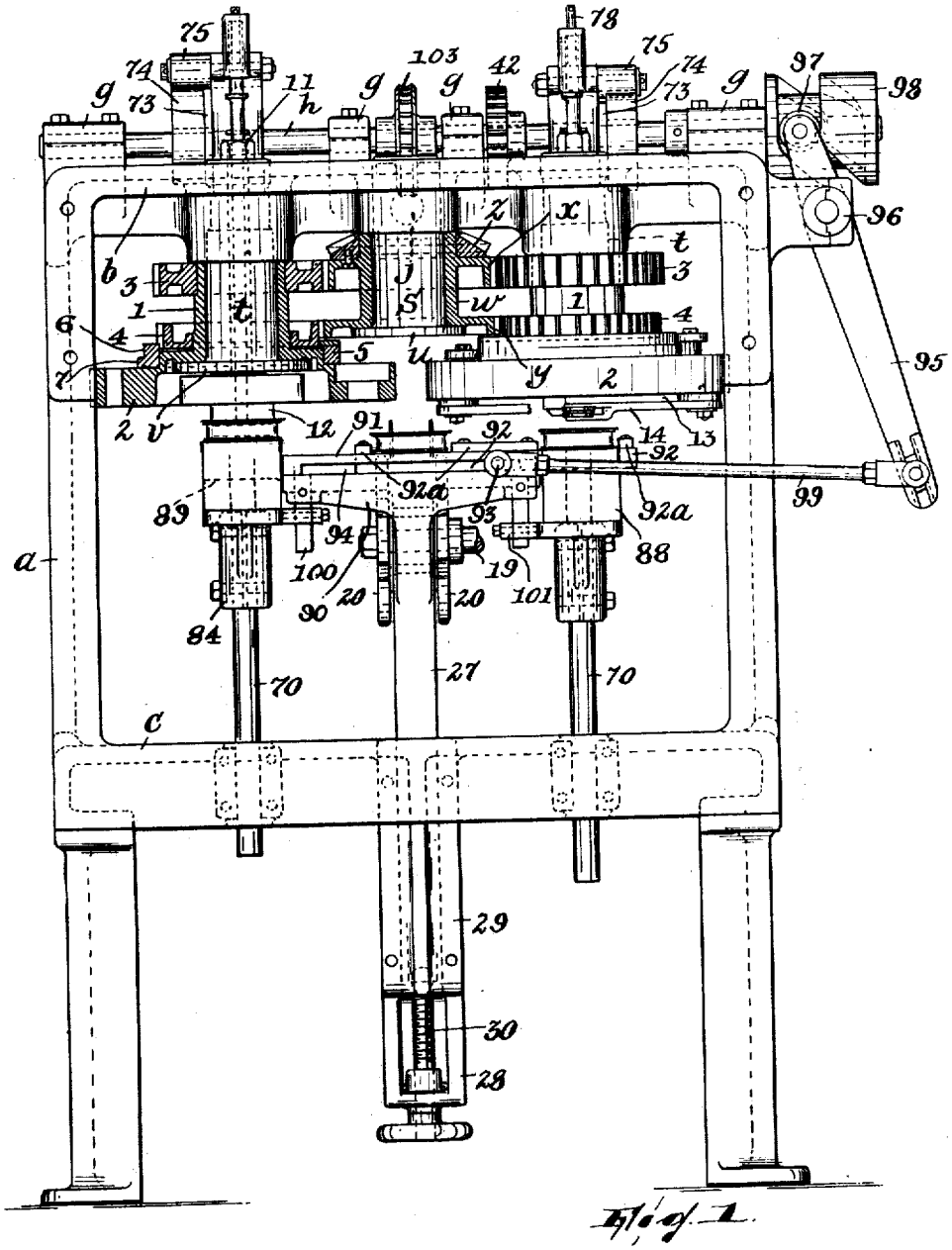

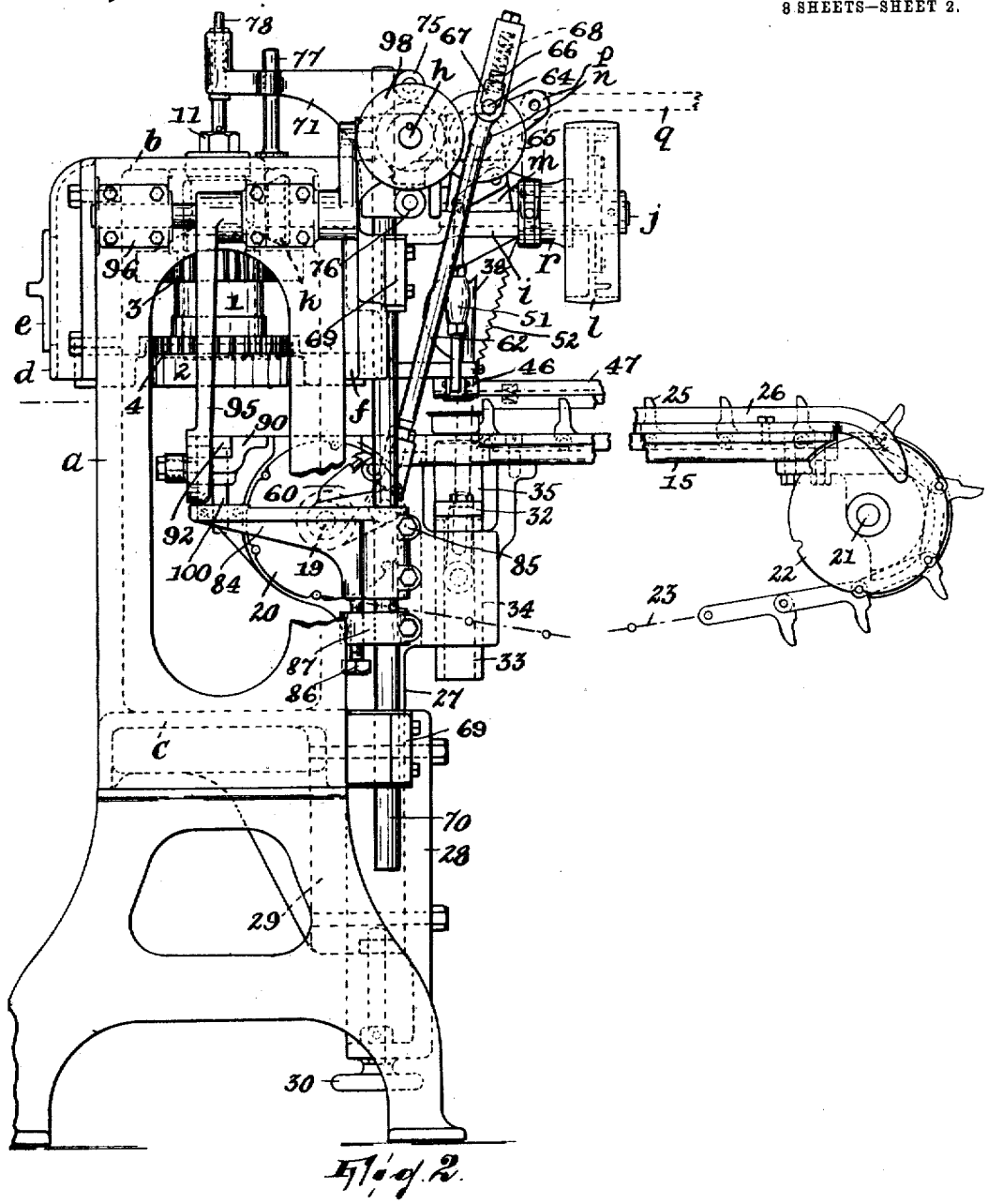

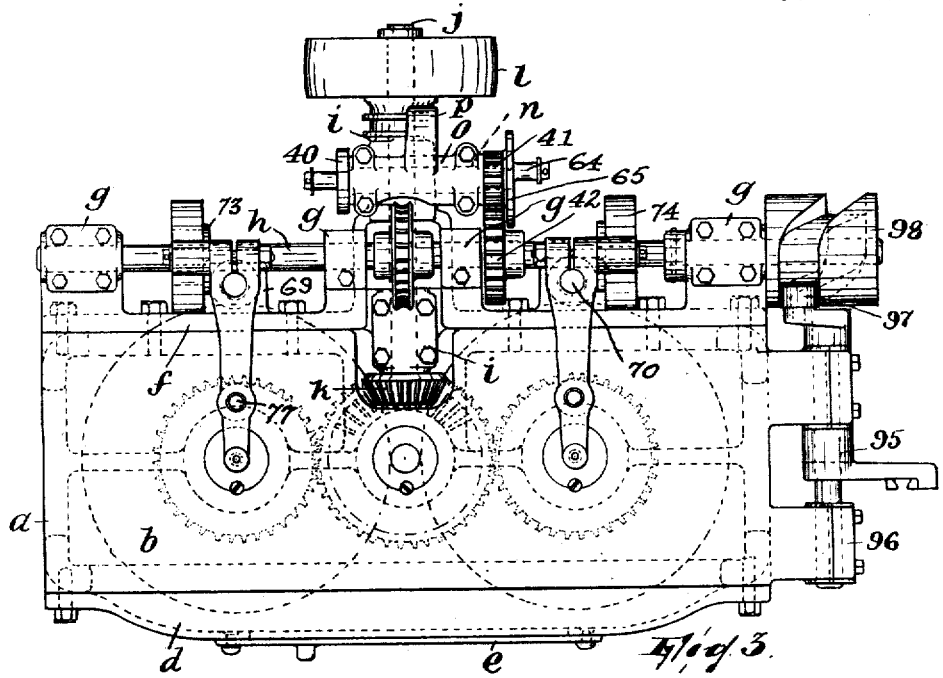
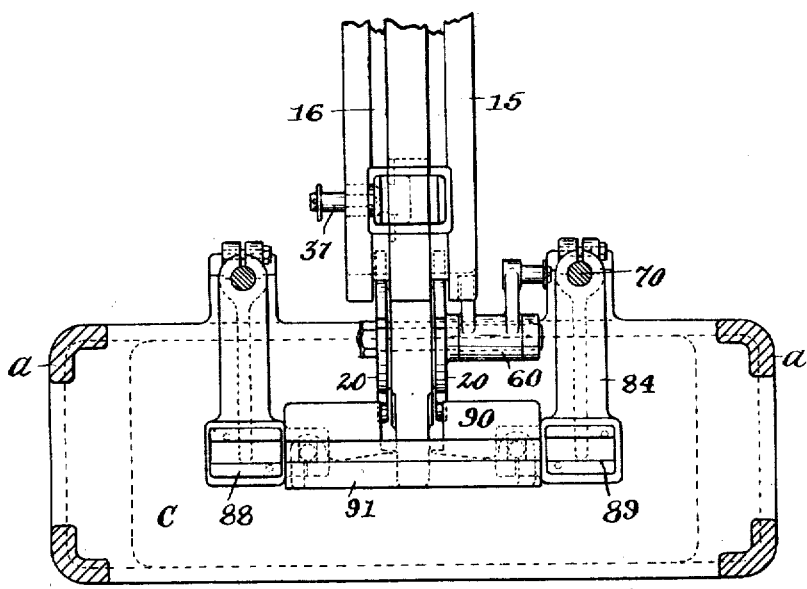

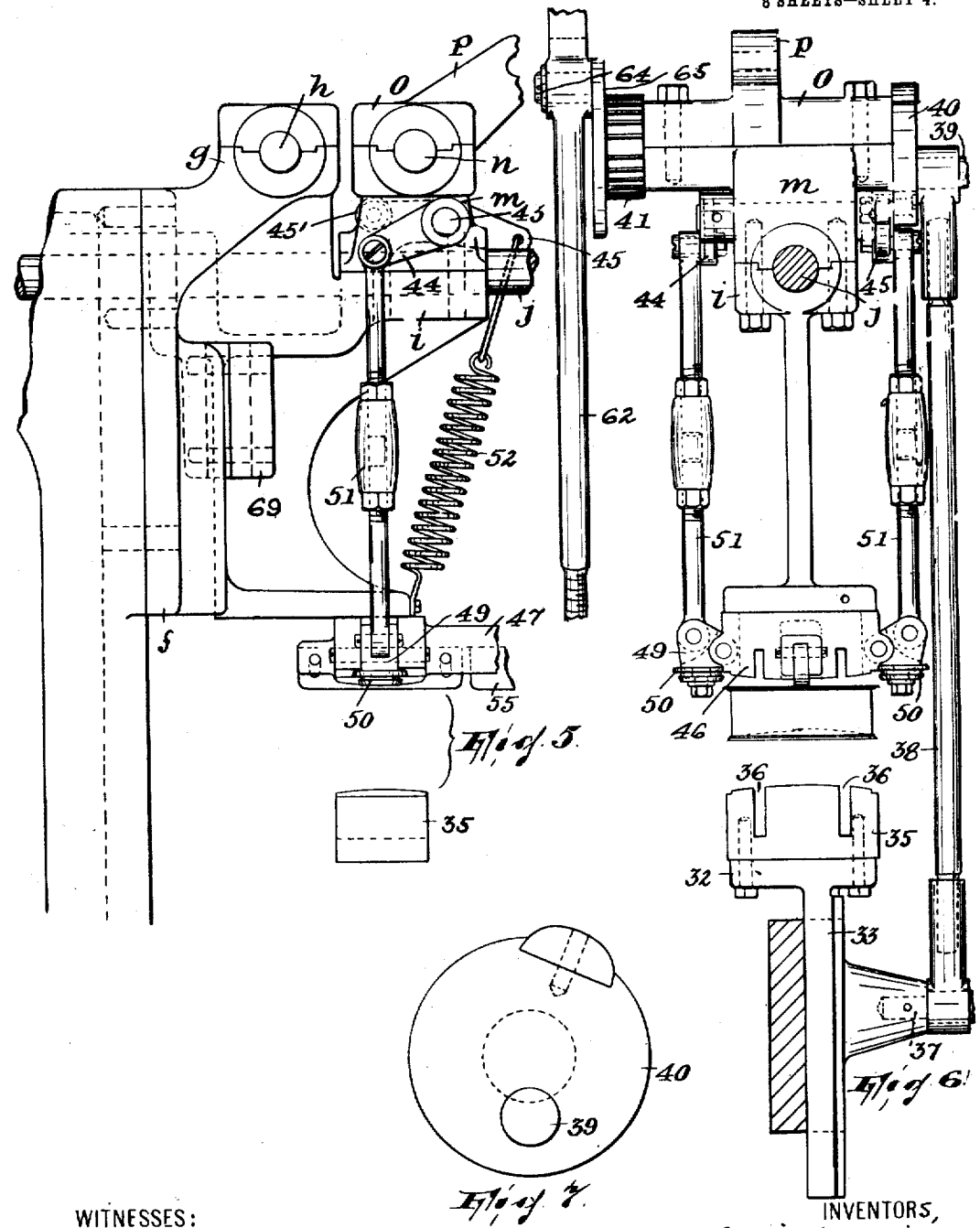

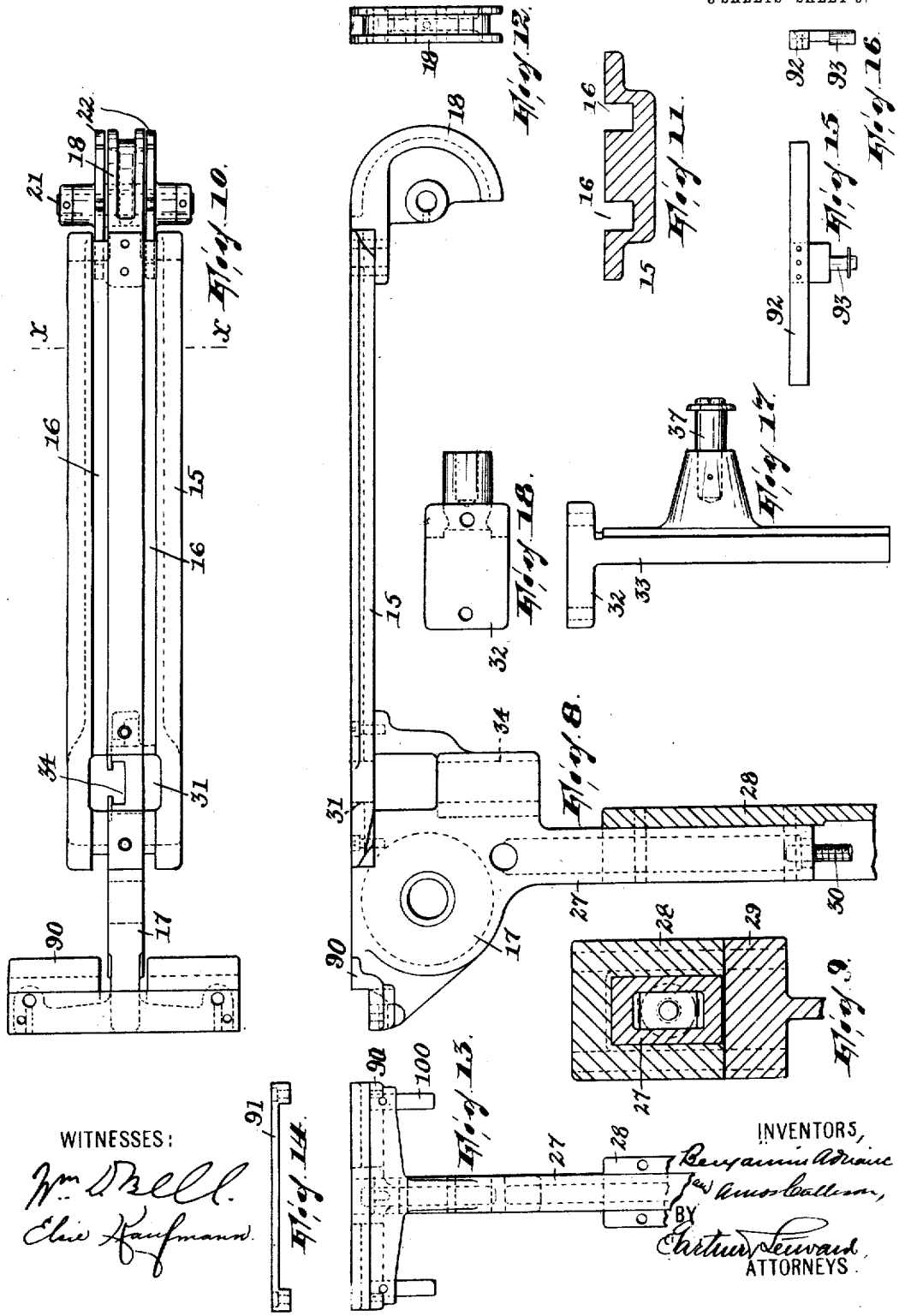

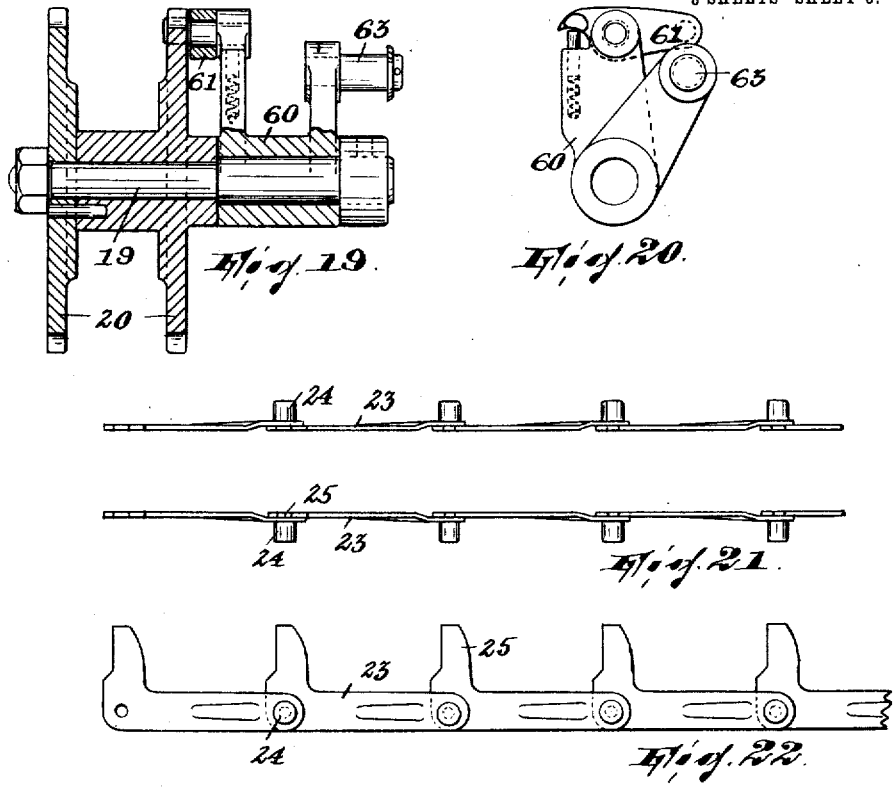
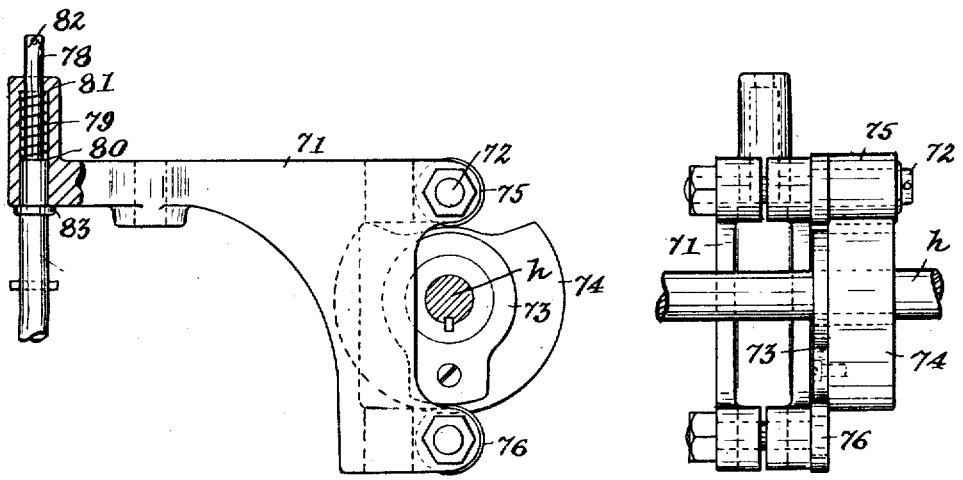

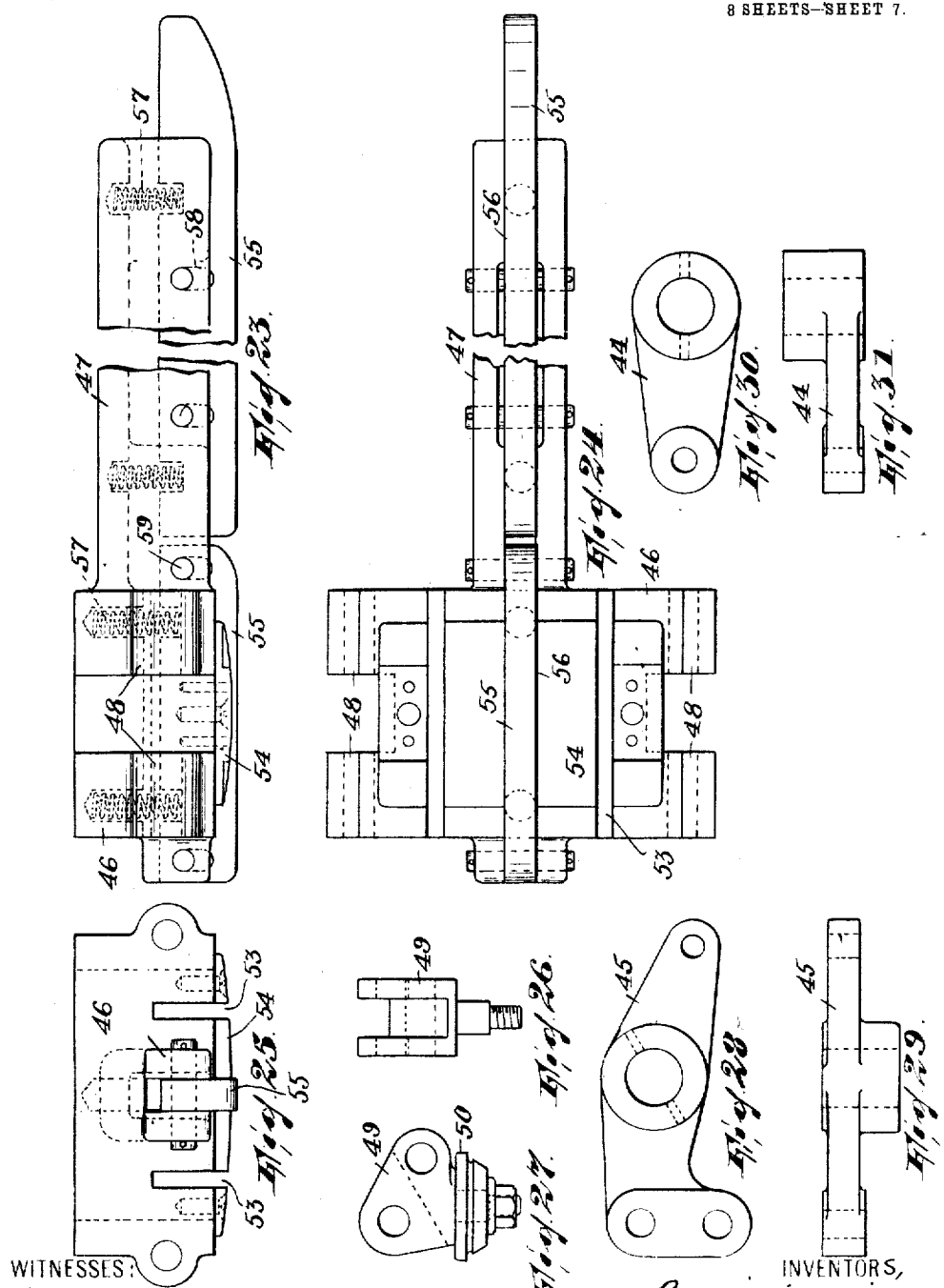

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

DUPLEX CAN-HEADING MACHINE.

947,271.     Specification of Letters Patent.     Patented Jan. 25, 1910.

Application filed July 22, 1907. Serial No. 384,963.

*To all whom it may concern:*

Be it known that we, BENJAMIN ADRIANCE and AMOS CALLESON, citizens of the United States, residing in Brooklyn, county of Kings, State of New York, have invented a certain new and useful Duplex Can-Heading Machine; and we do hereby declare the following to be a full, clear, and exact description of the invention, such as will enable others skilled in the art to which it appertains to make and use the same, reference being had to the accompanying drawings and to characters of reference marked thereon, which form a part of this specification.

This invention relates to machinery for affixing heads to sheet metal vessels by means of solderless joints, and it consists in certain improvements in machinery of this type having for their principal objects to increase the output without increasing the labor and attention necessary to control the machine; to make possible operating on vessels filled with liquid or semi-liquid contents as well as solid contents; to improve the character of the product, *i. e.*, the completely headed vessel, as a salable article of manufacture, together with other objects, some of which will be hereinafter mentioned and all of which will be obvious to those familiar with this art upon a view to the following description and the accompanying drawings, wherein, Figure 1 is a view of the machine in front elevation, showing certain parts in section; Fig. 2 is a view in side elevation of the machine; Fig. 3 is a top plan view, certain parts being removed; Fig. 4 is a horizontal sectional view taken just above the plane in which the vessels are fed to the head affixing means; Fig. 5 is an enlarged view in side elevation of the means for clenching the edges of the heads and cans together; Fig. 6 is a view in rear elevation of what is seen in Fig. 5; Fig. 7 illustrates a detail of one of the parts shown in Figs. 5 and 6; Fig. 8 is a view in side elevation of the platform forming part of the feed run-way for the cans and heads; Fig. 9 is a horizontal sectional view taken through the supporting standard of said run-way and the part of the frame of the machine in which the standard is mounted; Fig. 10 is a top plan view of said platform; Fig. 11 is a sectional view on the line *x—x* in Fig. 10; Fig. 12 is a view of the rear end of said platform; Fig. 13 is a view of the front end of said platform; Fig. 14 shows a certain strap which rests on the front end of said platform, forming therewith a guide; Fig. 15 is a plan view of the slide which works in said guide; Fig. 16 is an end view of said slide; Fig. 17 is a front view and Fig. 18 a top plan view of a can support which coöperates with the mechanism shown in Figs. 5 and 6; Fig. 19 is a view partly in section and partly in elevation of a part of a certain chain-actuating mechanism; Fig. 20 is a view in side elevation of certain parts shown in Fig. 19; Figs. 21 and 22 are top plan and side views of the chain; Figs. 23, 24 and 25 are, respectively, side, top plan and rear end views of another part of the mechanism shown in Figs. 5 and 6; Figs. 26 and 27 are, respectively, side and front views of the clenching device; Figs. 28 and 29 are, respectively, side and top plan views of certain cranks shown in Figs. 5 and 6; Figs. 30 and 31 are, respectively, side and top plan views of certain other cranks shown in Figs. 5 and 6; Figs. 32 and 33 are, respectively, side and rear views of a part of the means for elevating the cans and heads into the plane of action of the seaming nurls; Fig. 34 is a view partly in section and partly in elevation of the seaming means, certain parts being removed; Fig. 35 is a top plan view, partly in section, of certain parts shown in Fig. 34; Fig. 36 is a view of a detail of the mechanism shown in Figs. 34 and 35; and Fig. 37 shows the main driving shaft.

In the adaptation herein shown the invention comprises several mechanisms which, by way of introduction, may be briefly outlined as follows: The cans, which are of that type having a horizontally projecting top flange and whose heads enter them with a sort of wedge action and have similar flanges, are successively placed, with their heads resting on them, on a suitable conveyer by which they are conducted first to a clenching mechanism whereby the heads are jammed into the cans sufficiently so that the wedge action between each can and head forms a seal preventing undue leakage (if the contents are liquid) during the subsequent operations on the can while in the machine, such clenching means acting to bend over the flanges of the can and head at (say, two) isolated points to insure holding the head down on the can for the time being; the cans are next conducted to a means which distributes them, as they successively approach, to the seaming means; and thereupon the seaming means are brought into action to complete the closing, by seaming, each seaming means operating as fast as a can and head is brought to it, i. e., alternately with respect to the other seaming means.

In the drawings $a$ is a frame having an upper platform $b$ and a lower platform $c$; $d$ is a front plate provided with a door $e$ and $f$ a casting in the form of a plate having alined bearings $g$ for a horizontal shaft $h$ extending parallel with the back of the machine and other bearings $i$, arranged at right angles to the bearings $g$, for a shaft $j$ which is the main drive shaft of the machine and (Fig. 37) carries at its inner end a bevel-pinion $k$ and at its outer end (Figs. 2 and 3) a pulley $l$.

The cap $m$ of the rear bearing $i$ (Fig. 5) in turn forms a bearing for a horizontal shaft $n$ arranged parallel to the shaft $h$ and the cap $o$ of this bearing is formed with an integral arm $p$ in which is fulcrumed a suitable lever $q$ for controlling the member $r$ of a clutch whereby the pulley $l$, which is loose on shaft $j$, may be operatively connected with the shaft $j$ to rotate the same.

The platform $b$ carries three depending posts $s$ and $t$, $t$, each of which is flanged as at $u$, $v$, at its lower end. The flanged post $s$ forms a bearing for a twin gear wheel $w$ the upper member $x$ of which is of a different diameter from the lower member $y$. To this twin gear is attached a bevel gear $z$ which meshes with the bevel pinion $k$ on shaft $j$; shaft $j$ is thus adapted to rotate the twin gear.

On each post $t$ is journaled the sleeve portion 1 of a disk 2 carrying a gear 3 meshing with the member $x$ of gear $w$. On each sleeve 1 is revolubly arranged another annular gear 4 which meshes with the member $y$ of gear $w$; on the disk 2 rests an annulus 5 having peripheral cam ways 6 and 7, and this annulus is made to rotate with the gear 4 by means of a key 8 (Fig. 36) which is secured by a screw 9 to the top of the annulus and engages between any two teeth in the gear 4.

Through each post $t$ extends vertically a threaded hollow stem 10 secured in the post by a nut 11; on the lower end of the same is screwed a suitable chuck 12 grooved on its under side. At diagrammatically opposite points in each disk 2 are arranged pairs of levers 13 and 14 which are constructed and coöperate with the grooved chuck 12 and the cam-ways 6 and 7 of the annulus 5 substantially as described in U. S. Letters Patent No. 810,245, issued January 16, 1906, to which reference is made for a description in detail thereof. The construction of the two seaming units is substantially the same throughout as that presented in said Letters Patent except that in the present instance the annulus 5 is made adjustable, rotatively with respect to gear 4, so as to change the relation between its cam-ways 6 and 7 and the pairs of levers 13 and 14 at will, which is accomplished by removing the key 8, then turning the cam ring to the new position desired, and then resetting the key in engagement with the gear 4.

15 is a platform forming a part of the runway for the cans and provided with two parallel longitudinal grooves 16 on its top surface and having a narrowed bearing portion 17 at one end and a narrowed bearing portion 18 at the other end, a shaft 19 carrying sprocket wheels 20, separated by said bearing portion 17, being mounted in the former and a shaft 21 carrying sprocket wheels 22, separated by the bearing portion 18, being mounted in said bearing portion 18. An endless chain comprising pairs of links 23, adjoining ones of which are connected by pins 24 projecting outwardly, runs over the sprocket wheels 20, 22, said sprocket wheels being formed with notches in their peripheries (Fig. 2) to receive the pins 24 of the chain. The two parts of the chain run in the grooves 16 of the platform 15. Each link of the chain has an upwardly projecting finger 25 at one end. A guard 26 is arranged along one side of the platform 15. The cans, with the heads resting thereon, are laid on the platform 15 in contact with the guard 26, a pair of fingers 25 of the chain being adapted, as the latter advances in the manner hereinafter described, to advance the can along the platform. The outer end of the guard is turned downwardly beside the adjoining sprocket wheel 22 to protect the workman's hand against being caught in the mechanism at this point while placing the cans on the platform.

The platform 15 is formed with a leg or standard 27 which is received by a channeled guide 28 bolted against a flat vertical depending portion 29 of the lower platform $c$. In the lower end of the guide 28 is swiveled an adjusting screw 30 which is tapped into the lower end of the standard 27. By manipulating this hand screw the platform may be elevated to any desired height.

The platform 15 is formed with an opening 31 below which is adapted to move vertically the flat head 32 of a can support 33 which is arranged to move in a guide way 34 forming a part of the casting comprising the standard 27 of the platform 15. 35 is a chuck which is secured to the head 32 of the can support and is grooved at 36 to correspond to the grooves 16 of the platform 15, with a view to accommodating the chain. The can support 33 has a stud 37 to which is connected one end of a pitman 38 whose other end is connected with a crank pin 39 on a cam 40 on one end of the shaft n. The cam 40 and a pinion 41 on the other end of the shaft n, which pinion meshes with a pinion 42 on the shaft h, confines said shaft against endwise movement in its bearings. It may be stated at this point that the can support is reciprocated vertically each time a can is presented over its chuck 35, which result is effected by an intermittent advance of the chain as hereinafter described; when it rises, the chuck stands in the path of the can which is to follow that already on the chuck, the chain being then received by the grooves 36, and when it falls the chuck is low enough so that its top surface is approximately level with the top surface of the platform 15, permitting the next can to be slid on to the chuck.

The cap m of the rear bearing i for shaft j forms a bearing for a short shaft 43 on one end of which is secured a single crank 44 and on the other end of which is secured a double crank 45. The plate f is formed with an overhang projecting over the chuck 35, and to the under side of this overhang is attached another chuck 46 having a horizontal tail piece 47. In lateral lugs 48 on the sides of the chuck 46 are pivoted blocks 49 carrying rotary peripherally grooved nurls 50. Each block is connected with the crank 44 and the corresponding arm of the other crank 45 by an adjustable pitman 51; a spring 52, connecting the other arm of the crank 45 with the overhang, so normally acts (see Figs. 5 and 6) as to retract the nurls and hold a roller 45' on crank 45 against the periphery of cam 40. The nurls thus normally stand horizontally, and when the blocks carrying them are moved downwardly on their pivots, they somewhat approach each other, whereby they clench, by turning over together, the body and head flanges of the can at opposite points thereof. Similarly to the chuck 35, the chuck 46 is grooved on its under side, as at 53, in this instance to permit the passage of the fingers 25 of the chain. The under side of the chuck 46 may carry a die 54 of any form, preferably convex, which it is desired to present against the top or head of the can.

In order to promote accuracy of operation, it is desirable to keep the cans flat against the top of the platform 15 as they successively approach a position between the chucks 35 and 46, and to this end spring-actuated pressers 55 are arranged in alined grooves 56 formed in the under side of the chuck 46 and its tail piece 47; 57 indicates the springs which normally hold the pressers down to the limit of vertical slots 58 formed in them and receiving pins 59 arranged in the chuck and tail piece and traversing the grooves 56.

The intermittent advance of the chain above described is effected as follows: On the shaft 19 is loosely arranged a two-armed crank 60 in one arm of which is pivoted a spring-pressed pawl 61 movable with the arm in an arc substantially coincident with the notches of one of the sprocket wheels 20, the inclination of the pawl being such that as the crank is oscillated on the shaft, the pawl will engage the notches of said wheel and thus move the same and the chain forward one can-length, moving back without turning wheel 20. The oscillation of the crank 60 is effected by a pitman 62 pivotally connected to a crank pin 63 on the other arm of the crank 60 and to a crank 64 on a face plate 65 on the shaft n. In order to prevent any possible clogging of the cans as they are advanced by the chain from damaging the cans, the connection between crank 60 and the crank pin 64, afforded by the pitman 62, is made yielding by providing in the pitman a slot 66 in which moves a block 67 which bears against the crank 64 and is cushioned by a spring 68 in the pitman.

In a vertical plane directly back of the center of each seaming unit are arranged vertically alined bearings 69 in which are adapted to reciprocate vertically shafts 70. Referring to Figs. 32 and 33, 71 is an arm which is clamped to each of these shafts by means of bolts 72. On the shaft h to one side of each arm is arranged a cam 73 (74). On the bolts 72 are journaled rollers 75 and 76 respectively bearing against the peripheries of the cams 73 and 74 in such manner that as the cams rotate with the shaft the arm will be reciprocated vertically, carrying with it the shaft 70.

77 is a post fixed to the upper platform b, penetrating the arm 71 and thus keeping the shaft 70 from turning in its bearings.

In each arm 71 is arranged an ejecting stem 78 which projects down through the stem 10 in the manner shown in Fig. 34. 79 is a spring interposed between a shoulder 80 on the stem 78 and the end of a socket 81 in arm 71, which socket the stem penetrates, said spring normally pressing the stem downwardly as far as a stop pin 82, which bears against the top of the arm 71, will permit. 83 is a shoulder formed on the stem below the arm 71. If a can after the heading operation, should adhere to the chuck of the seaming mechanism, the stem 78 as it descends with the arm 71 will effect the ejection of said can.

On each shaft 70 relatively below each heading means is arranged another arm 84, the same having a split portion receiving the shaft which is clamped thereto by bolts 85. The vertical position of this arm on the shaft may be adjusted, upon turning the bolts 85 and a set screw 86 mounted in a collar 87 secured on the shaft below the arm. 88 is a lower chuck carried by each arm 84 and adapted to coöperate with the chuck 12 of the heading means to hold the can during the heading operation. For a purpose hereinafter indicated, the chuck 88 is transversely grooved, as at 89, on its top side.

The front end of the platform 15 is formed as a table 90 rabbeted along the front, and in this rabbet fits a guide 91 in the form of a plate having depending lugs at both ends. This guide 91 does not abut against the back of the rabbet, but is spaced therefrom (see Fig. 4), so that a groove is formed which is alined with grooves of the chucks 88. In these grooves is adapted to move a slide 92 having a stud 93 which projects through the slot 94 formed under the guide. 92ª designates three blocks arranged on the slide and spaced from each other a distance corresponding to the length of each can. This slide is reciprocated from a lever 95 fulcrumed in a bracket 96 and carrying a roller 97 which engages in the groove of a cam 98 on the shaft $h$, through a pitman 99 connecting said lever with the stud 93.

As a further means for keeping each shaft 70 true in its bearings, the table 90 carries depending lugs 100 on which slide extensions 101 which are penetrated thereby and form parts of the arms 84.

The power is transmitted from shaft $j$ to shaft $h$ by means of a worm 102 on shaft $j$ and a worm wheel 103 on shaft $h$.

Operation: Power being taken into the machine through shaft $j$, said shaft on the one hand rotates the rotary members of the seaming or heading means. The parts of the seaming mechanisms are so adjusted relatively to each other that as they are continuously driven from the gears $y$ and $z$ their seaming levers 13 and 14 will be alternately actuating, i. e., effective for seaming. On the other hand, shaft $j$, in driving shaft $h$, firstly, actuates the can and head advancing means, operating through shaft $h$ to shaft $n$, through the gearing 42 and 41, to rotate said shaft and thus vibrate, through pitman 62, the crank 60, which in vibrating advances the chain 23 in a step by step movement as already described; secondly, the cans and heads placed on the platform 15 being successively advanced by the fingers of the chain to a position over the chuck 35, said shaft, after each advancement of the chain, raises the slide 33 carrying the chuck 35, operating through shaft $h$, gearing 41 and 42, shaft $n$, and pitman 38 in order to effect this; thirdly, as the chuck assumes its highest elevation, the can, with the head resting thereon, is brought against the chuck 46, whereupon shaft $j$ operates through shaft $h$, gearing 41 and 42 to shaft $n$ to rotate the latter and cause its cam 40 to rock shaft 43, in the manner already described, and thus, through pitman 51, cause the blocks 49 to move the clenching nurls 50 against the can and head edges at opposite points thereof, so that isolated portions of said can and head edges are bent downwardly into interlocking engagement with each other; fourthly, upon the slide 33 dropping down again until the chuck is level with the top of the platform 15, and the next advancement of the chain, a preceding can which has already passed through the clenching operation and which is being advanced by those behind it, is slid on to the table 90 over the slide 92 and between the blocks 92ª thereon, whereupon from shaft $j$, through shaft $h$, cam 98, lever 95 and pitman 99, the slide is moved from one of its limits of movement to the other, placing the can just received by it over one of the chucks 88; and, fifthly, said chuck 88 is raised to press the can against the chuck 12 ready for the seaming operation, which elevating action is effected from shaft $j$, through shaft $h$ by the cam 74 operating against the roller 75 carried by the arm 71.

The operations of the means for first clenching the can and head flanges together and then effecting the continuous or endless folding over of said flanges are so timed with respect to each other that when each can and head is presented to the latter means, the seaming tools thereof begin their operation at the clenched portions of the flanges; the seaming means therefore begins its operation at the most favorable points on the flanges of the can and head, with the result that the seam formed is uniform and regular in character and hermetic throughout.

We do not claim broadly herein the mechanism for clenching together the can body and head flanges, that being reserved in an application filed by us of even date herewith, Serial No. 384,961.

Having thus fully described our invention, what we claim and desire to secure by Letters Patent is:

1. In combination, with an advancing means for the parts to be operated upon, a means for holding said parts alined with the advancing means, said holding means being recessed to accommodate the advancing means, and means for causing the constituent members of said holding means to coöperate in holding said parts, substantially as described.

2. In combination, with a runway for the parts to be operated upon and an advancing means movable lengthwise of said runway, a holding means for said parts occupying the same vertical zone as the runway and being recessed to accommodate the advancing means, and means for causing the constituent members of the holding means to coöperate in holding said parts, substantially as described.

3. In combination, with a suitable support and an advancing means for the parts to be operated upon, a yielding presser extending parallel with said advancing means and adapted to press said parts against the same during their advancement, substantially as described.

4. In combination, with a runway for the parts to be operated upon and an advancing means, a suitable support and a yielding presser extending parallel with said runway and adapted to press said parts against the same during their advancement, substantially as described.

5. In combination, with an advancing means for the parts to be operated upon, a holding means for said parts comprising two members one of which is movable toward and from the other, one of said members extending parallel with said runway, and a yielding presser arranged in said member opposite to and parallel with the runway and coöperating therewith to hold said parts together during their advancement, substantially as described.

6. In an advancing means for parts to be operated upon, the combination of an endless chain having projections to engage said parts, a chain supporting means comprising a sprocket wheel, a crank engageable with said wheel to move the same and advance the chain, a crank actuating means, and a yielding connection between said crank and the actuating means, substantially as described.

7. The combination, with the frame, separate devices for bending the edges of the cans and heads into interlocking engagement with each other, and means for causing said devices to operate alternately, of separate means for holding the cans and heads each comprising two members, one of which is movable toward the other, and means for alternately moving the movable members toward their complementary holding members whereby to hold the cans and heads while being operated upon by the corresponding bending devices, substantially as described.

8. The combination, with the frame, separate devices for bending the edges of the cans and heads into interlocking engagement with each other, and means for causing said devices to operate alternately, of separate means for holding the cans and heads each comprising two members, a shaft journaled in said frame, and cams on said shaft adapted to effect the alternate actuation of the members of said holding means, substantially as described.

9. The combination, with the frame, of means for bending the edges of the cans and heads into interlocking engagement with each other comprising can holding members one of which is movable toward the other, an ejecting device located in opposed relation to said movable member, a vertically movable part forming a common support for said holding member and the ejecting device, and means for reciprocating said part, substantially as described.

10. The combination, with the frame, of means for bending the edges of the cans and heads into interlocking engagement with each other comprising can holding members one of which is movable toward the other and located relatively below the edge-bending plane, an ejecting device penetrating the bending means from above, a vertically movable part forming a common support for said movable holding member and the ejecting device, and means for reciprocating said part, substantially as described.

11. In a can heading machine, the combination, with means for holding the can and head, of rotary parts having a common axis, a cam revolubly arranged on one of said parts, means, carried by said part, for securing the cam in fixed relation thereto, a shaping tool carried by the other part and adapted to be actuated by said cam, and means for rotating said parts at different speeds, substantially as described.

12. In a can-heading machine, the combination, with means for holding the can and head, of rotary parts having a common axis, and one of them having an annular series of teeth, a cam rotatably adjustable on the toothed part, a key carried by said cam and engaging the teeth of said toothed part, a shaping tool carried by the other part and adapted to be actuated by said cam, and means for rotating said parts at different speeds, substantially as described.

13. In a can heading machine, the combination, with the frame, of a clenching device adapted to clench together a limited portion of the flange of each can and its head, means, also in said frame, for thereupon folding over said flanges endlessly, and means for moving the clenching device into clenching relation to the work and thereupon retracting the clenching device, said folding means being operative after the clenching device has been retracted, substantially as described.

14. In a can-heading machine, the combination, with the frame, of means, in said frame for clenching together limited portions of the flanges of each can and its head, means, also in said frame for thereupon folding over said flanges endlessly, and means for effecting coöperation between said first-and-second-named means whereby to cause the latter to begin its operation on the can and head flanges at the clenched portions thereof, substantially as described.

15. The combination, with a runway, of means for advancing the can bodies and head along said runway, means for performing a clenching operation upon said bodies and heads while in progress along the runway, whereby to establish a temporary union between them, separate means, located adjacent the discharge end of said runway and one on each side thereof, for permanently uniting the bodies and heads, and means for delivering the bodies and heads from the runway to said permanent uniting means, alternately, substantially as described.

In testimony, that we claim the foregoing, we have hereunto set our hands this 2nd day of July, 1907.

BENJAMIN ADRIANCE
AMOS CALLESON.

Witnesses:
JOHN W. STEWARD,
JAMES VAN WICKLEN.